(12) United States Patent
Scanlon

(10) Patent No.: US 7,419,091 B1
(45) Date of Patent: Sep. 2, 2008

(54) CASH DISPENSING AUTOMATED BANKING MACHINE WITH DISPOSABLE CASH DISPLAY

(75) Inventor: Michael Scanlon, Edinburgh (GB)

(73) Assignee: Diebold Self-Service Systems division of Diebold, Incorporated, North Canton, OH (US)

( * ) Notice: Subject to any disclaimer, the term of this patent is extended or adjusted under 35 U.S.C. 154(b) by 508 days.

(21) Appl. No.: 11/090,676

(22) Filed: Mar. 25, 2005

Related U.S. Application Data

(60) Provisional application No. 60/557,819, filed on Mar. 30, 2004.

(51) Int. Cl.
*G06Q 40/00* (2006.01)
*G07D 11/00* (2006.01)
*G07F 19/00* (2006.01)
*G06F 7/08* (2006.01)

(52) U.S. Cl. .......................... 235/379; 235/381; 705/43
(58) Field of Classification Search .................. 902/8, 902/15, 21, 14; 705/24, 43
See application file for complete search history.

(56) References Cited

U.S. PATENT DOCUMENTS 5,952,639 A * 9/1999 Ohki et al. .................. 235/379
6,138,907 A * 10/2000 Mori et al. .................. 235/379
2002/0069168 A1* 6/2002 Lee et al. ...................... 705/40
2002/0133409 A1* 9/2002 Sawano et al. ................ 705/16
2003/0066876 A1* 4/2003 Goldman et al. ............. 235/379
2004/0177036 A1* 9/2004 Nutahara et al. .............. 705/39

FOREIGN PATENT DOCUMENTS

| JP | 2002-312599 A | * | 10/2002 |
| JP | 2003-256913 A | * | 9/2003 |
| JP | 2003-323547 A | * | 11/2003 |
| JP | 2004-86631 A | * | 3/2004 |
| WO | WO 02/27576 A1 | * | 4/2002 |

* cited by examiner

*Primary Examiner*—Jared J Fureman
(74) *Attorney, Agent, or Firm*—Ralph E. Jocke; Daniel D. Wasil; Walker & Jocke

(57) ABSTRACT

An automated banking machine system and method is provided which is operative to display a disposable cash amount associated with an account. The disposable cash amount is calculated responsive to the current Available Balance and responsive to future debit and credits that are expected to post to the account. The disposable cash amount may be calculated by a computer of the ATM or by a computer in operative connection with the ATM such as host banking system or other server of the financial institution associated with the account. The ATM may provide a user interface which minimizes the number of inputs to dispense an amount of cash equal to the calculated disposable cash amount. The ATM or a web site, or other computer may provide a customer with the ability to edit and modify the parameters used to calculate the disposable cash amount for an account.

25 Claims, 11 Drawing Sheets

FIG. 17

ATM State 8

Visual Output

ENTER NEW DEBIT DATE:
- MONTH (MM) 11
- DAY (DD) 21
- YEAR (YYYY) 2003

← CLEAR AMOUNT

ENTER →
CANCEL →

FIG. 18

ATM State 9

Visual Output

IS THIS NEW DEBIT AMOUNT AND DATE CORRECT?

- AMOUNT $25.75
- DATE Nov. 21. 2003

NO →
YES →

CASH DISPENSING AUTOMATED BANKING MACHINE WITH DISPOSABLE CASH DISPLAY

CROSS REFERENCE TO RELATED APPLICATIONS

This application claims benefit under 35 U.S.C. § 119 (e) of U.S. Provisional Application Ser. No. 60/557,819 filed Mar. 30, 2004, which is hereby incorporated by reference herein.

TECHNICAL FIELD

This invention relates to cash dispensing automated banking machines. Specifically, this invention relates to automated banking machines which provide information regarding an amount of disposable cash associated with a banking account of a customer.

BACKGROUND ART

Automated banking machines are well known. A common type of automated banking machine used by customers is an automated teller machine (hereinafter "ATM"). ATMs enable customers to carry out banking transactions such as the dispensing of cash, the transfer of funds between accounts, the payment of bills, and/or account balance inquiries. Automated banking machines may also print or dispense items of value such as coupons, tickets, wagering slips, vouchers, checks, food stamps, money orders, and traveler's checks.

The types of banking transactions a customer can carry out at an ATM are determined, in part, by the capabilities and design of the particular banking machine, the capabilities and design of the host banking system with which the ATM interfaces, and the programming of the institution operating the machine. For purposes of this disclosure, references to an ATM, an automated banking machine, or an automated transaction machine are interchangeable.

One of the most common transactions performed by a customer at an ATM is the withdrawal of cash from a bank account. In such a transaction, a customer interfaces with an ATM by identifying himself, identifying the account from which the money is to be withdrawn, and identifying the desired amount of money to be withdrawn. The ATM interfaces with a host banking system to determine if the customer is authorized to dispense cash from the account and has sufficient funds in the account for the desired withdrawal.

While the withdrawal of cash from a bank account through an ATM may satisfy the customer's short term financial needs, it can also create financial problems. For example, if the bank account is a checking account and if the customer has recently written checks drawn from that account which have not yet been posted (i.e., cleared), or if the customer has authorized certain creditors to automatically withdraw periodic payments from that account, the withdrawal of available funds from an ATM can result in checks and/or automatic payments being refused at some later point in time by the bank due to the account having insufficient funds to cover those withdrawals.

Consequently, there exists a need for a system and method which minimizes the risk of checks and/or automatic payments being refused as a result of a customer withdrawing too much cash from an account associated with the checks and/or automatic payments.

DISCLOSURE OF INVENTION

It is an object of an exemplary form of the present invention to provide an automated banking machine.

It is a further object of an exemplary form of the present invention to provide an automated banking machine at which a customer may dispense cash.

It is a further object of an exemplary form of the present invention to provide an automated banking machine which is operative to enable a customer to dispense cash from an account used to draft checks and/or provide automatic payments.

It is a further object of an exemplary form of the present invention to provide an automated banking machine which is operative to minimize the risk of checks and/or automatic payments associated with an account being refused as a result of a customer withdrawing too much cash from the account using the machine.

Further objects of exemplary forms of the present invention will be made apparent in the following Best Modes for Carrying Out Invention and the appended claims.

The foregoing objects may be accomplished in an exemplary embodiment by an automated banking machine that includes output devices such as a display screen and receipt printer. The machine may further include input devices such as a touch screen, keyboard, keypad, function keys, and card reader. The automated banking machine may further include transaction function devices such as a cash dispenser mechanism for sheets of currency, a depository mechanism and other transaction function devices which are used by the machine in carrying out banking transactions including transfers of value. In the exemplary embodiment the automated banking machine may include at least one computer. The computer may be in operative connection with the output devices and the input devices, as well as with the cash dispenser mechanism, depository mechanism and other physical transaction function devices in the banking machine. The computer may further be operative to communicate with a host banking system and/or other server located remotely from the machine.

In the exemplary embodiment, the computer of the automated banking machine may include software programs that are executable therein. The software programs of the automated banking machine may be operative to cause the computer to output user interface screens through a display device of the machine. The user interface screens may include customer screens which provide a customer with information for performing customer operations such as banking functions with the machine. The user interface screens may further include service screens which provide an authorized user servicing the machine with information for performing service and maintenance operations with the machine. In addition the machine may further include software programs operative in the computer for controlling and communicating with hardware devices of the machine including the transaction function devices.

In one exemplary embodiment, the automated banking machine is operative to enable a customer to withdraw an amount of cash from an account. The machine may output one or more user interface screens through a display device which prompts the user to indicate an amount of cash to withdraw. The machine may contact a host banking system to authorize the withdrawal. In response to receiving the authorization from the host banking system, the machine may dispense the cash to the user through operation of a cash dispenser of the machine.

In the exemplary embodiment, the machine may be operative to cause information associated with the account to be displayed on one or more user interface screens. The information displayed may include an account balance of currently available funds associated with the account of the customer. As used herein such an account balance is referred to as an available balance for an account. The information displayed may also include a further amount associated with the account which represents the amount of cash the customer can withdraw after taking into consideration the available balance and one or more debit and/or credit transactions which are expected to post to the account at a future time. Such further amounts displayed by the machine may correspond generally to a customer's disposable cash.

Examples of expected debits may include payments from the account for a mortgage, rent, car loan, utility bill, student loan, credit card, or any other debit which can be estimated to post one or more times in the future to the account. Expected credits to the account may include a paycheck or other source of income which is expected to post to the account at generally regular intervals. In an exemplary embodiment, the calculation of the disposable cash amount displayed by the automated banking machine may correspond to the amount of currently available funds associated with the account minus the total amount of debits expected to post to the account prior to the next credit which is expected to post to the account.

In an exemplary embodiment, the automated banking machine may provide the user with the ability to withdraw at least a portion of the disposable cash amount in a manner which minimizes the number of inputs into the machine. For example, the machine may provide a user interface screen which directs the user to press a particular keypad key, function key, touch screen button, or provide some other input, if the user would like to have the machine dispense an amount that is equal to all or a lesser portion of the calculated disposable cash amount. In response to the customer providing the input as prompted by the machine, the machine may be operative to contact a host banking system to authorize the dispense and if authorized cause a cash dispenser in the machine to dispense the amount indicated without requiring further inputs from the customer.

In further exemplary embodiments, the machine may output a user interface screen which includes information representative of one or parameters used to calculate the disposable cash amount. Such parameters may include a listing of future debits and/or credits and the dates such debits and credits are expected to post to the account.

In a further exemplary embodiment, the machine may be operative to provide user interface screens with which a user may input and edit the parameters used to calculate the amount of disposable cash for an account. Also, an exemplary embodiment of a system which includes the described automated banking machine may include a web site which enables a customer to input and edit the parameters used to calculate the disposable cash for an account. Such parameters, whether inputted through an ATM screen, web site, or other system, may be stored in a data store in operative connection with the account of the customer.

BRIEF DESCRIPTION OF DRAWINGS

FIGS. 10-20 are schematic views of another exemplary embodiment illustrating a plurality of different ATM states encompassed by the present invention.

BEST MODES FOR CARRYING OUT INVENTION

Figure 1:
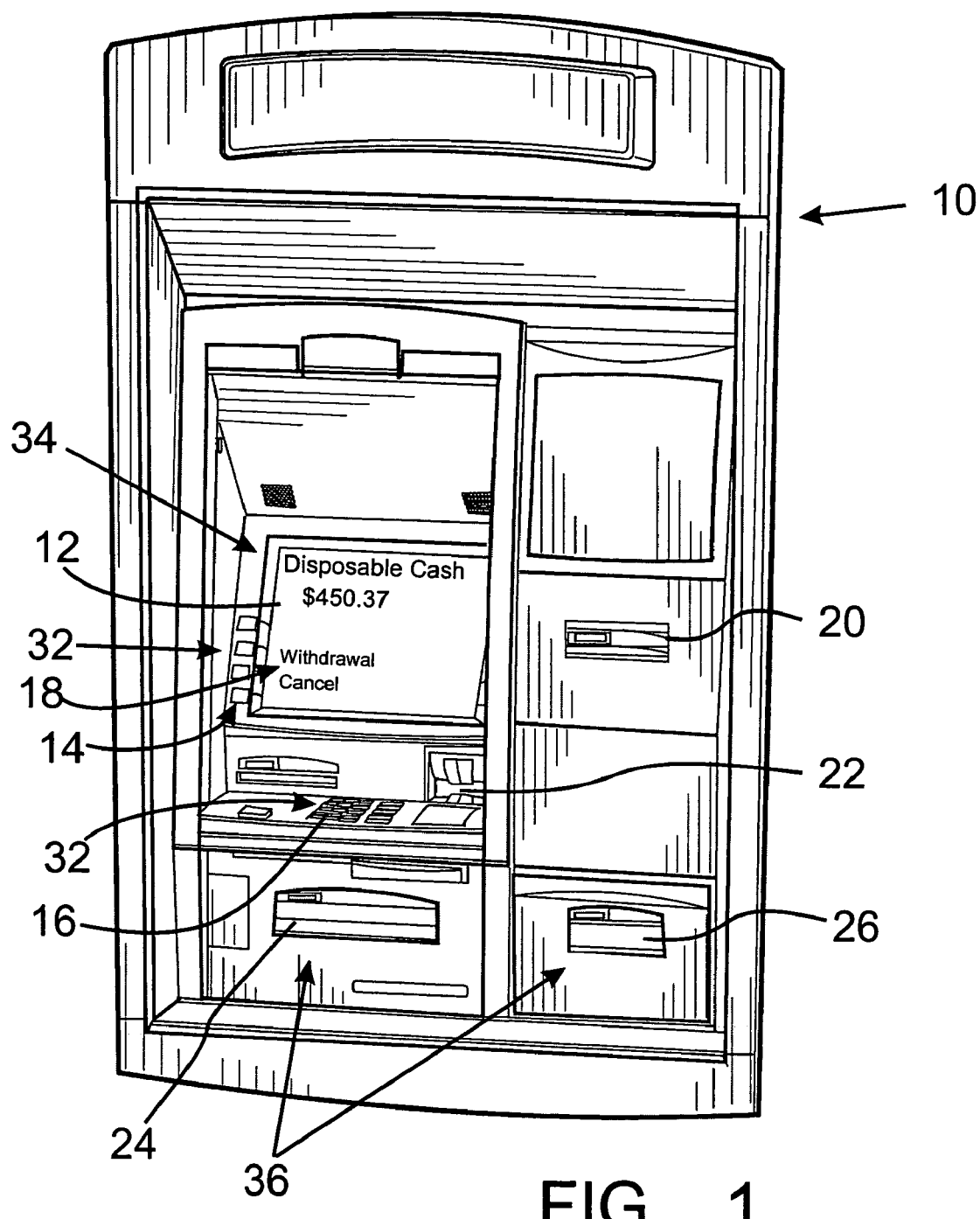
FIG. 1 is a perspective view representative of an exemplary embodiment of an ATM incorporating certain features encompassed by the present invention.

Referring now to the drawings and particularly to FIG. 1, there is shown therein a perspective view of an exemplary automated banking machine 10 such as an ATM. Here the ATM 10 may include at least one output device 34 such as a display device 12. The display device 12 may be operative to provide a customer with a user interface 18 that may include a plurality of screens with menus or other outputs including selectable options for operating the machine. The exemplary embodiment may further include other types of output devices such as a receipt printer 20, speakers, or any other type of device that is capable of outputting visual, audible, or other sensory perceptible information.

The exemplary embodiment of the automated banking machine 10 may include a plurality of input devices 32 such as an encrypting pin pad with keypad 16 and function keys 14 as well as a card reader 22. The exemplary embodiment of the machine 10 may further include or use other types of input devices, such as a touch screen, microphone, or any other device that is operative to provide the machine with inputs representative of user instructions or information. The machine may also include one or more biometric input devices such as a fingerprint scanner, an iris scanner, facial recognition device, hand scanner, or any other biometric reading device which may be used to read a biometric input that can be used to identify a user.

The exemplary embodiment of the automated banking machine 10 may further include a plurality of transaction function devices which may include for example a cash dispenser 24, a depository mechanism 26, cash recycler mechanism, or any other type of device which is operative to perform transaction functions involving transfers of value.

Figure 2:
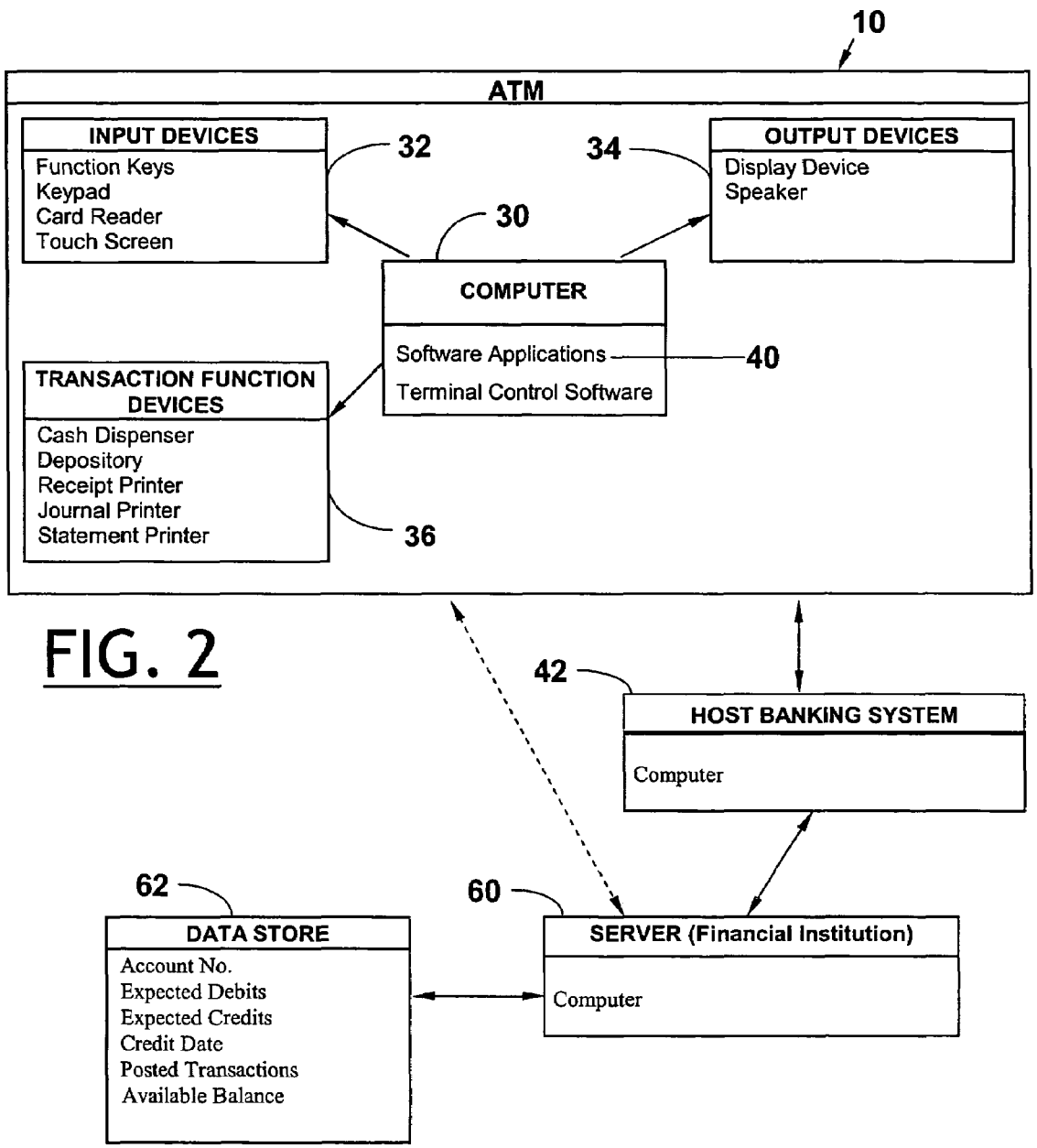
FIG. 2 is a schematic view of the exemplary embodiment of an ATM system encompassed by the present invention.

FIG. 2 shows a schematic view of components which may be included in the automated banking machine 10. The machine 10 may include at least one computer 30. The computer 30 may be in operative connection with the input device(s) 32, the output device(s) 34, and the transaction function device(s) 36. The exemplary embodiment may further include at least one terminal control software component 40 operative in the computer 30. The terminal control software components may be operative to control the operation of the machine by both a customer and an authorized user such as a service technician. For example such terminal control software components may include applications which enable a customer to dispense cash, deposit a check, or perform other transaction functions with the machine. In addition the terminal control software components may include applications which enable a service technician to perform configuration, maintenance, and diagnostic functions with the machine.

Exemplary embodiments of the automated banking machine 10 are operative to communicate with a transaction processing server which is referred to herein as an ATM host banking system 42. Such an ATM host banking system 42 may correspond to a remote computer which is operative to authorize the automated banking machine 10 to perform transaction functions for users such as withdrawing cash from an account through operation of the cash dispenser 24, depositing checks or other items with the depository mechanism 26, performing a balance inquiry for a financial account and transferring value between accounts.

Terminal control software components 40 may be operative to organize and display with a user interface different transaction functions into a hierarchy using a plurality of menus and submenus. A menu may be visually and/or audibly output to the customer for each of the different ATM states. Each menu may be operative to list those functions which may be performed in any given ATM state. Selecting an option or function visually listed or verbally described in a menu will usually cause the ATM to change to a different state.

Terminal control software may be operative to generate a user interface screen which includes one or more menu options for displaying an account balance corresponding to a selected account associated with the customer. Such an account balance may correspond to the currently available funds associated with the account. In an exemplary embodiment the account balance is determined with the ATM contacting the host banking system which is operative to access an account balance associated with an account of the customer.

In addition to being operative to display an account balance representative of the currently available funds in the account, the ATM may be operative to determine a further amount referred to herein as the disposable cash amount associated with an account. The disposable cash amount may correspond to an estimate for the amount of value that will be left in the account after one or more expected transactions have posted to the account before the next paycheck or other credit is expected to be deposited in the account.

In an exemplary embodiment, an automated banking machine may be operative to enable a customer to provide information representative of a financial account through operation of at least one input device of the ATM and determine through operation of at least one computer of the ATM, a disposable cash amount associated with the account. In addition, the ATM may be operative to display through operation of the at least one computer of the ATM, the disposable cash amount through at least one output device of the ATM. Once the disposable cash amount is displayed, the automated banking machine may be operative to enable a customer to dispense an amount of cash equal to all or a lesser portion of the disposable cash amount without having the customer enter an amount into an input device of the ATM.

In this described exemplary embodiment the ATM may request and receive the disposable cash amount from the host banking system or other remote server. In an alternative exemplary embodiment, rather than requesting and receiving the disposable cash amount from the host banking system or other server, the ATM may be operative to calculate the disposable cash amount directly. In this described exemplary embodiment the automated banking machine may be operative to access the parameters (i.e., information) usable by the machine to calculate the disposable cash amount for the specified account from a host banking system or other server. In exemplary embodiments the automated banking machine may also enable the customer to view and/or edit the parameters used to calculate the disposable cash amount. Edited data parameters may then be transmitted back to the host banking system or other server and stored in association with the account.

In exemplary embodiments an account balance generally represents the currently available funds in an account and is referred to herein as an "Available Balance". An account's disposable cash amount is determined by taking into consideration the account's Available Balance, and parameters associated with expected future transactions and/or transactions that have previously posted to the account. Such parameters may include the dates and amounts of prescribed future debits to that account (hereinafter "expected debits"), if any, and the dates and amounts of prescribed future credits to that account (hereinafter "expected credits"), if any. The term "prescribed" as used herein means that the customer has selected, through either a manual or automatic process, which future debits and/or credits to a specified bank account are to be used in the calculation of the account's disposable cash amount.

Regarding expected credits, any credit to a specified account can be prescribed as such by the customer. For example, expected credits can be any payments that are automatically credited to the specified account on a periodic basis, any payments that are electronically deposited or transferred to the specified account, and/or any payments that are manually deposited by the customer into the specified account (i.e., cash or check deposits). Specific examples of such payments that can be used as expected credits include: wage credits, alimony or child support credits, unemployment benefit credits, tax refund credits, dividend credits, interest credits, and the like. The interest credits may include the interest earned with respect to the specified account or another account which is deposited into the specified account.

Regarding expected debits, any debit to a specified account can be prescribed as such by the customer. For example, expected debits can be any withdrawals that are automatically debited from the specified account on a periodic basis, any withdrawals that are electronically debited or transferred from the specified account, and/or any orders that are manually generated by the customer to be paid from the specified account (i.e., checks). Specific examples of such withdrawals that can be prescribed as expected debits include: spending cash withdrawals, mortgage payments, alimony or child support payments, credit card payments, utility payments, insurance payments, savings or pension plan payments, and the like.

In exemplary embodiments, customers may identify expected debits and credits manually by individually inputting expected debit/credit amounts and associated dates or date ranges into a user interface adapted to receive such information. Such a user interface may be provided by an ATM, a web site that provides access to the account, or any other system that is operative to store expected debit/credit information in a data store in association with an account. For example, in an exemplary embodiment a web server may provide user interface web pages at a web site which enable computers on a global communication network such as the Internet to remotely input expected debit/credit amounts, dates and other associated data from their personal computers. Expected debit/credit data provided though use of the web pages may be received by the web server and stored in a data store in association the account that was accessed through use of the web server.

In further exemplary embodiments the system used to input expected debit/credit amounts may be operative to automate the process by automatically generating expected debit/credits responsive to previously posted transactions to the account. Also in exemplary embodiments, a user interface may present to the customer which lists previously posted transactions, and the customer may select which previously posted transactions correspond to expected debits/credits. The user interface may be responsive to the selected transaction to cause expected debit/credits to be stored in the data store in association with the account. In further exemplary embodiments, an ATM may include an invoice reader which is capable of reading information from a utility bill, credit card bill, or other printed bill or invoice which requires a payment. The invoice reader may be capable of scanning the printed bill and acquire information (i.e. payment amount, due date, biller description) usable by the ATM to cause an expected debit to be generated and stored in association with the specified account. The invoice reader may also be capable of determining from a printed bill whether the payment amount corresponds to a one time payment or periodic payment. Corresponding expected debits generated from the scanned invoice may then be set up as either a one time expected debit for the associated one time payment date, or may be setup as ongoing expected debits which occur periodically (e.g. monthly, quarterly, yearly) and have a known fixed payment amount or a variable payment amount which can be estimated to fall below a specified amount.

As shown in FIG. 2 in the exemplary embodiment, a host banking system 42 and/or other server 60 may be in operative connection with one or more data stores 62 which include stored therein the parameters such as expected debits/credits 64 for an account that are prescribed by the customer. The server 60 associated with the financial institution may also be operative to provide the Available Balance amount for the account and a listing of transactions that have posted to the account. Such an Available Balance amount and a listing of posted transactions for an account may be stored in the one or more data stores 62 in association with the account and the expected debits/credits. However, it is to be understood that the Available Balance and listing of posted transactions for an account may also be acquired by the server 60 from another data store or server that provides information associated with a customer's account.

The expected debits or credits stored in the data store 62 are stored in association with the customer's account. The information stored for each expected debit or credit in the data store 62 may include an amount and a date or date range the expected debit or credit is expected to post to the account. The dates stored in association with the expected debits or credits may correspond to a specific date or date range that occurs only once or may be a date or date range that re-occurs every week, month, or year for example. In addition, the information stored for each expected debit or credit in the data store 62 may also include the name of the payee (or payor) or other identifying description that is associated with the transaction.

In an exemplary embodiment, the server 60 may be operative to calculate the disposable cash amount responsive to the information associated with the account which are stored in the data store 62 or are accessed from other servers. The ATM of the exemplary embodiment may be operative to determine this disposable cash amount by communicating with the host banking server 42 which in turn communicates with the server 60 to request the disposable cash amount. In alternative exemplary embodiments, the ATM may be operative to securely communicate directly with the server 60 through a public or private network to acquire the disposable cash amount from the server 60. In further alternative exemplary embodiments, the ATM may be operative to acquire the parameters usable to calculate the disposable cash amount from the server 60. In further alternative exemplary embodiments, the host banking system may be operative to calculate the disposable cash amount in response to the information accessed from the server 60 for an account specified by the ATM.

As shown in Equation 1, an ATM, host banking system, or other server, may be operative to calculate the disposable cash, by subtracting the total of one or more expected debits (hereinafter referred to as the account's "Total Forthcoming Debits" amount) from the current Available Balance for the account.

$$\text{Disposable Cash} = \text{Available Balance} - \text{Total Forthcoming Debits} \qquad [1]$$

The Total Forthcoming Debits may correspond to the total amount that is expected to be debited from the account between the day on which the disposable cash amount is requested (hereinafter referred to as "Current Date") and the day of the next prescribed future credit to that account (hereinafter referred to as next "Credit Date"). In an exemplary embodiment, the next Credit Date may correspond to the date of the next expected credit after the Current Date. Also, in exemplary embodiments, the next Credit Date may correspond to a date selected by the customer. For example, the next Credit Date may correspond to a day of the month after which the customer's one or more paychecks or other sources of income are expected to be posted to the account.

In exemplary embodiments, transactions which were expected to occur on the Current Date or earlier, may not have yet posted to the account when a calculation for disposable cash is made. The Account Balance will be relatively higher than would otherwise be if such transactions posted to the account instantly. As a result, a Disposable Cash amount calculated from this inflated Available Balance may produce an amount that is too high to safely withdraw cash from the account and still leave sufficient funds to cover the Total Forthcoming Debits.

In a further exemplary embodiment, the Disposable Cash amount may further be calculated responsive to expected debits which were expected to post to the account by the Current Date but have not yet posted. Such debits are hereinafter referred to as the "Non-Posted Debits". In an exemplary embodiment, debits posted to an account may be compared to the listing of expected debits stored in association with the account to determine which of the stored expected debits expected to have occurred by the Current Date have not yet posted to the account. In this described exemplary embodiment, the Disposable Cash amount may be further calculated according to Equation 2 by subtracting out the total of Non-Posted Debits.

$$\text{Disposable Cash} = \text{Available Balance} - \text{Total Forthcoming Debits} - \text{Non-Posted Debits} \qquad [2]$$

The comparison between posted debits and stored expected debits may be performed by the ATM, host banking system, or other server. All stored expected debits with dates or date ranges that fall within a predetermined period before and including the Current Date may be compared to debits posted to the account on the corresponding dates or within the corresponding date ranges. Such a predetermined period may be on the order of several days or longer for example. Matching stored expected debits with posted debits may be accomplished by comparing the value amounts and descriptive information of the expected debits to the posted transactions for the account. In the exemplary embodiment, date ranges stored for the expected debits may be on the order of several days or longer to increase the accuracy of the comparison.

In addition, a comparison may also be made between expected debits after the Current Date and the posted transactions for an account to determine if one or more of the expected debits may have been posted to the account earlier than expected. In this described exemplary embodiment, such expected debits which have posted early may be omitted from the Total Forthcoming Debits used to calculate the Disposable Cash.

In exemplary embodiments, multiple credits may post to an account throughout a month or other time range. The customer may not intend such credits to be used for disposable cash as soon as they post to the account. Rather a customer may wish to allocate these credits for use with paying future debits that post after the next Credit Date such as a large mortgage or other payment. Unfortunately, such credits that post to the account by the Current Date will likely be reflected in the Available Balance, causing the calculated Disposable Cash amount to be higher than the customer may prefer.

In a further exemplary embodiment the ATM, host banking system, or other server, may be operative to calculate the Disposable Cash according to Equation 3, in which the one or more credits previously posted to the account (hereinafter referred to as "Posted Credits") are subtracted from the Available Balance.

$$\text{Disposable Cash} = \text{Available Balance} - \text{Total Forthcoming Debits} - \text{Non-Posted Debits} - \text{Posted Credits} \quad [3]$$

In this described exemplary embodiment, the Posted Credits may correspond to credits which have posted to the account after the Credit Date which occurred prior to the Current Date. For example, the Credit Date may be specified by the customer as occurring on the 2nd day of each month. If the Current Date corresponds to the 20th day of the month, then the Posted Credits would correspond to those credits which posted to the account between the 2nd day and 20th day of the month. Such Posted Credits which are not intended to be included in the Disposable Cash amount may include a paycheck issued on the 15th of the month for example, which may be needed to cover expected debits after the next Credit Date.

As shown in Equations 1-3, the parameters of Total Forthcoming Debits, Non-Posted Debits, and Posted Credits correspond to absolute (i.e., positive) values or sets of absolute values which are subtracted from the determined Available Balance for the account. In other exemplary embodiments, the equations may be modified to reflect these values being negative and/or positive. Further, in other exemplary embodiments the Total Forthcoming Debits, Non-Posted Debits, and/or Posted Credits may not be calculated individually and then subtracted from the Available Balance. Instead, the individual transactions which comprise these parameters may be subtracted from the Available Balance individually or in other groupings. As used herein subtracting a first number from a second number (e.g., N2−N1) includes adding a negative version of the first number to the second number (e.g., N2+−N1).

In exemplary embodiments, where the ATM is operative to calculate the Disposable Cash amount, the ATM may request and receive from a host banking system or other server, the parameters for performing the Disposable Cash calculation. Such parameters may include the Available Balance and Total Forthcoming Debits, Non-Posted Debits, and Posted Credits for example. However, in alternative exemplary embodiments, the ATM may be operative to request and receive from the host banking system or other server parameters used to calculate the Total Forthcoming Debits, Non-Posted Debits, and Posted Credits. Such parameters may include for example, the expected debits, expected credits, and the Credit Date value, and posted transactions associated with an account. The ATM may calculate the Total Forthcoming Debits, Non-Posted Debits, and Posted Credits from this accessed information.

FIGS. 3-9 are schematic views of one exemplary embodiment of an ATM encompassed by the present invention. Specifically, FIGS. 3-9 show schematic views of an ATM display in a plurality of different states. Such states are examples of one exemplary path a customer may take through the hierarchy of user interface menus for purposes of operating an ATM to determine an account's disposable cash amount and to dispense cash in an amount equal to all or a portion of the determined disposable cash amount.

Figure 3:
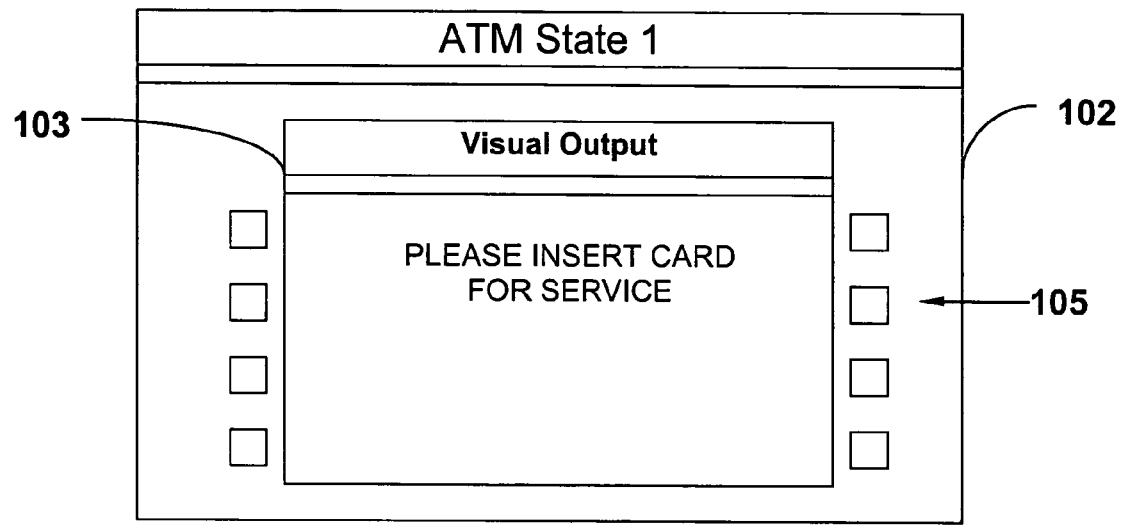
FIGS. 3-9 are schematic views of one exemplary embodiment illustrating a plurality of different ATM states encompassed by the present invention.

FIG. 3 shows an ATM display in a first mode or state 102 which may be active when a customer first approaches the machine. Here the ATM is operative to attract or invite customers to use the services of the ATM. This ATM shows a visible output through display screen 103. The ATM may also have function keys 105 which are positioned on both sides of display screen 103, and at set locations along the display screen's perimeter such that they can correspond with the location of menu options displayed to the customer on the screen. In an alternative exemplary embodiment, display screen 103 may include a touch screen. In such an embodiment, the display screen may include graphical buttons associated with the menu options.

The visible output displayed in FIG. 3 informs the customer that, in order to initiate an operation, the customer must perform an action to identify the customer or an account of the customer. In this described exemplary embodiment, the ATM displays instructions which prompt the customer to insert an ATM card into a card reader of the ATM. Such an ATM card may include an account number associated with the customer. In other exemplary embodiments, the ATM may be operative to wirelessly communicate with a smart card or other portable computing device capable of providing customer and/or account information.

Figure 4:
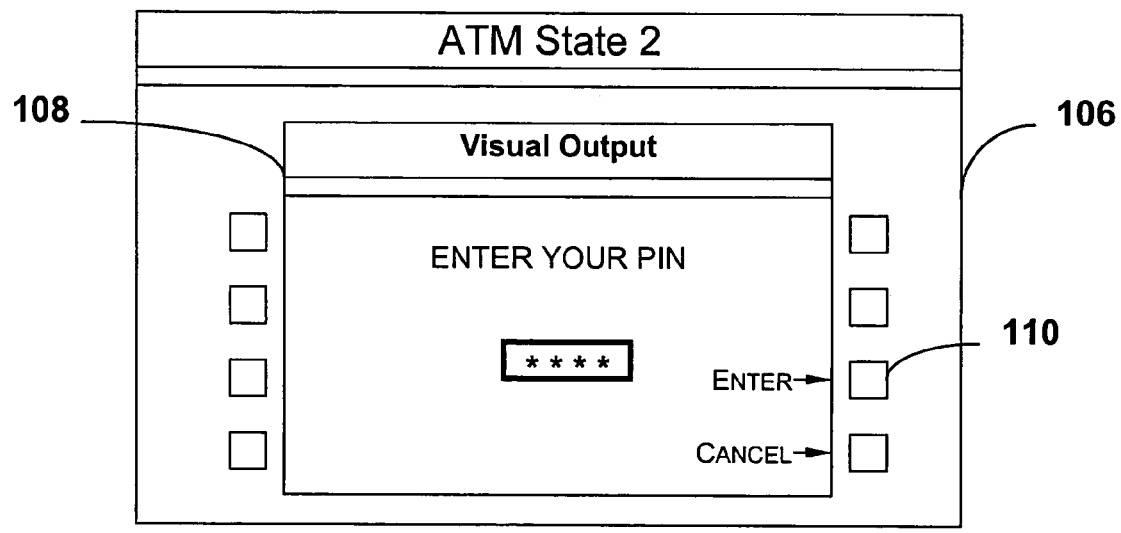

As shown in FIG. 4, once the card reader of the ATM has read account information or other identifying information from the customer's card, the exemplary embodiment of the ATM is operative to change to a second state 106. In this second state, a visible output 108 requests that the customer enter further information used to validate the customer. Such further information may include a password or Personal Identification Number ("PIN") associated with the account information read from the card. In this particular embodiment, as a customer presses each of the numeric keys of the ATM's keypad which correspond to the customer's PIN, the ATM may acknowledge each input by displaying an asterisk (*) symbol. In other exemplary embodiments the ATM may prompt the customer to validate his or her identity through use of a biometric reader of the ATM.

Figure 5:
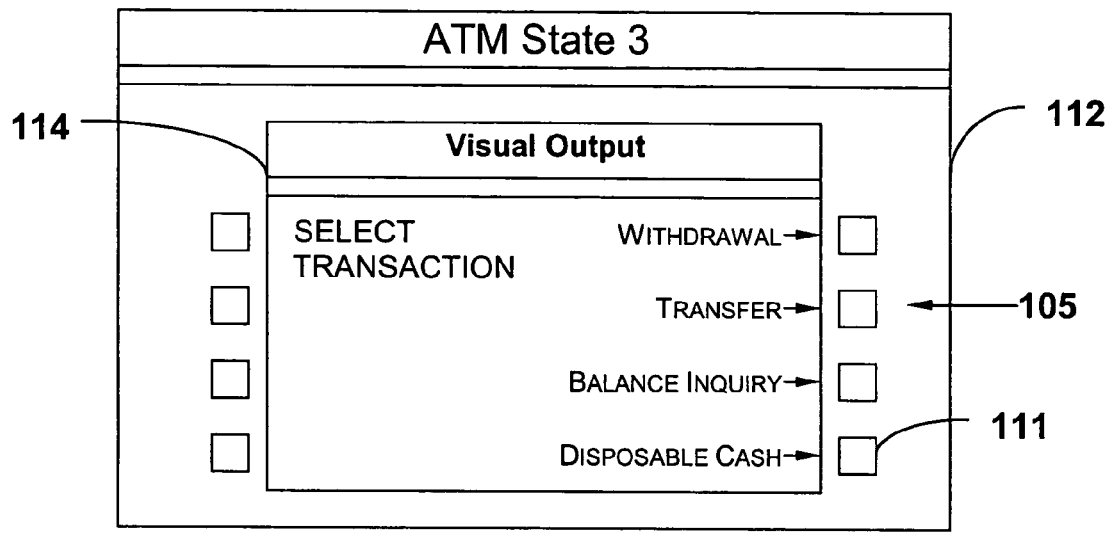

Once the customer inputs the PIN and presses the function key indicated with reference numeral 110, the exemplary ATM changes to a third state 112 illustrated in FIG. 5. As shown in FIG. 5, this third state 112 produces visible output 114 identifying a list of transaction functions from which the customer may choose. Each function corresponds with one of the function keys 105 adjacent the display screen of the ATM. In this described exemplary embodiment, the visible output 114 includes indicia representing a Disposable Cash transaction adjacent the function key indicated with reference numeral 111. If the customer wishes to choose the Disposable Cash transaction, the function key indicated with reference numeral 111 may be pressed. In response, the ATM changes to a fourth state.

Figure 6:
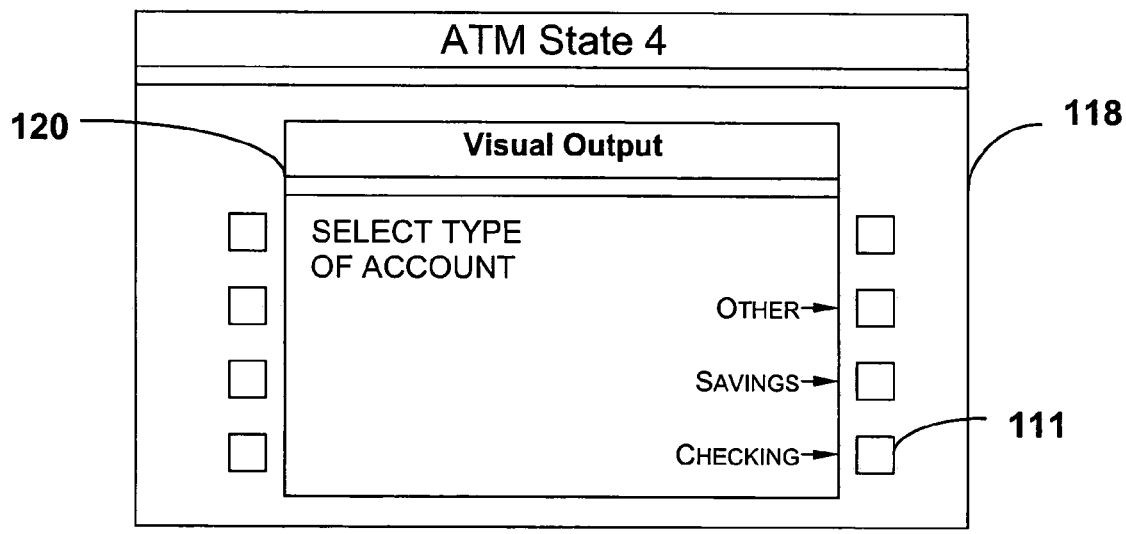

FIG. 6 shows an example of a fourth state 118. In this state, the ATM is operative to accept the selection of the account for which the customer wishes to see the disposable cash amount. Here the ATM produces a visible output 120 which lists a plurality of accounts for which the disposable cash amount can be displayed.

Typically, the disposable cash feature will be used in conjunction with a checking account. In such an exemplary embodiment, the customer would press the function key indicated with reference numeral 111. When the customer presses the function key indicated with reference numeral 111, this exemplary embodiment of the ATM changes to a fifth state.

Figure 7:
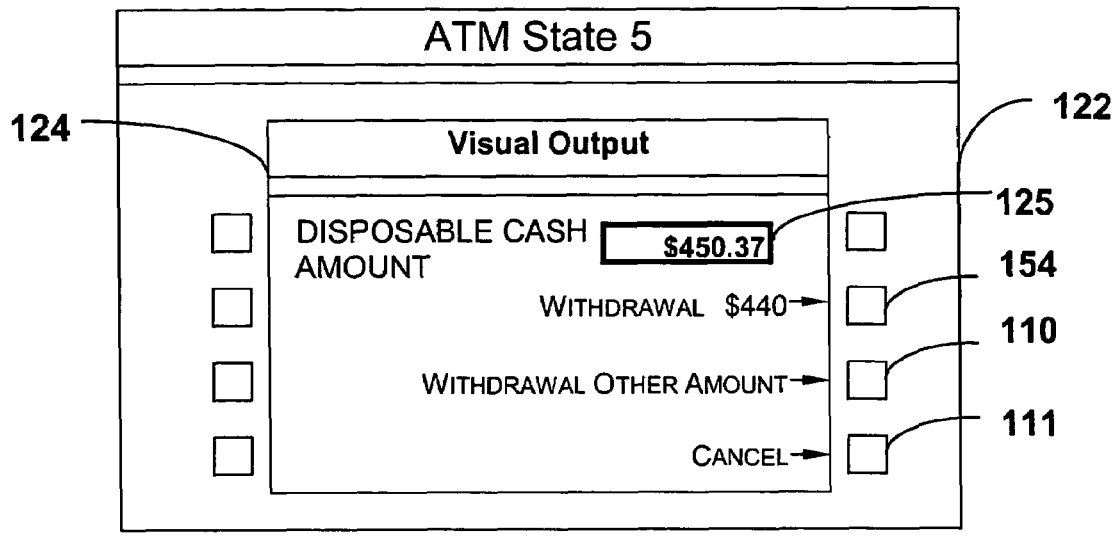

FIG. 7 shows an example of fifth state 122. In this state, a visual output 124 shows the disposable cash amount 125 for the selected account. The visual output 124 may also inquire whether the customer wishes to withdraw the disposable cash from the account. However, because many ATMs limit the amount of cash that can be withdrawn at one time and typically require a withdrawal of cash to be a multiple 5, 10, 20 or other amount of currency, the ATM may also be operative to calculate and display the portion of the disposable cash that the ATM is capable of dispensing at one time. If the customer wants this portion of the disposable cash to be dispensed, the function key 154 associated with this indicated amount may be pressed. On the other hand, if the customer wishes to withdraw a different amount, the function key indicated with reference numeral 110 may be pressed, and the ATM may prompt the user to enter a different amount.

Figure 8:
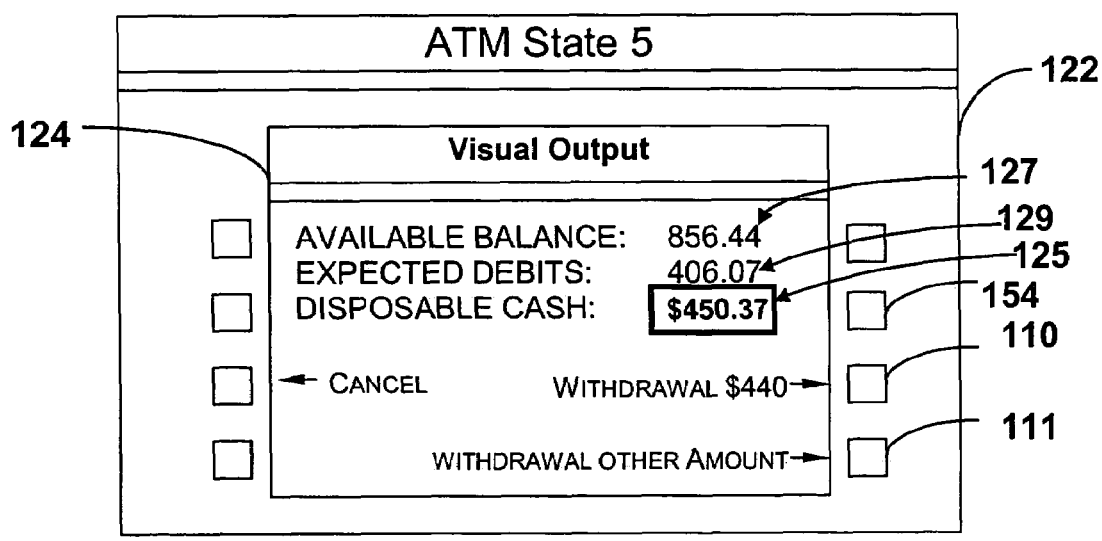

FIG. 8 shows an alternative exemplary embodiment of the visual output 124 for the described fifth state. Here the visual output may show the parameters used to calculate the disposable cash amount. Such parameters may include the Available Balance 127 associated with the selected account. Such parameters may also include the total of expected debits 129 associated with the account.

The expected debit total displayed may correspond to the Total Forthcoming Debits previous described or the sum of the Total Forthcoming Debits and Non-Posted Debits previously described. In further exemplary embodiments, the ATM may display each of the individual expected debits and any other information that is used to calculate the disposable cash amount.

In the exemplary embodiment, the customer may press the function key indicated with reference numeral 110 to have the ATM dispense cash in an amount equal to the portion of the disposable cash indicated. In response to the input, the computer of the ATM may be operative to communicate with a host banking system to authorize the withdrawal of cash from the account in an amount equal to the indicated portion of the disposable cash amount. In response to receiving a message from the host banking system authorizing the withdrawal, the computer of the ATM may be operative to cause the cash dispenser of the ATM to operate to dispense an amount of cash corresponding to the portion of the disposable cash indicated.

Figure 9:
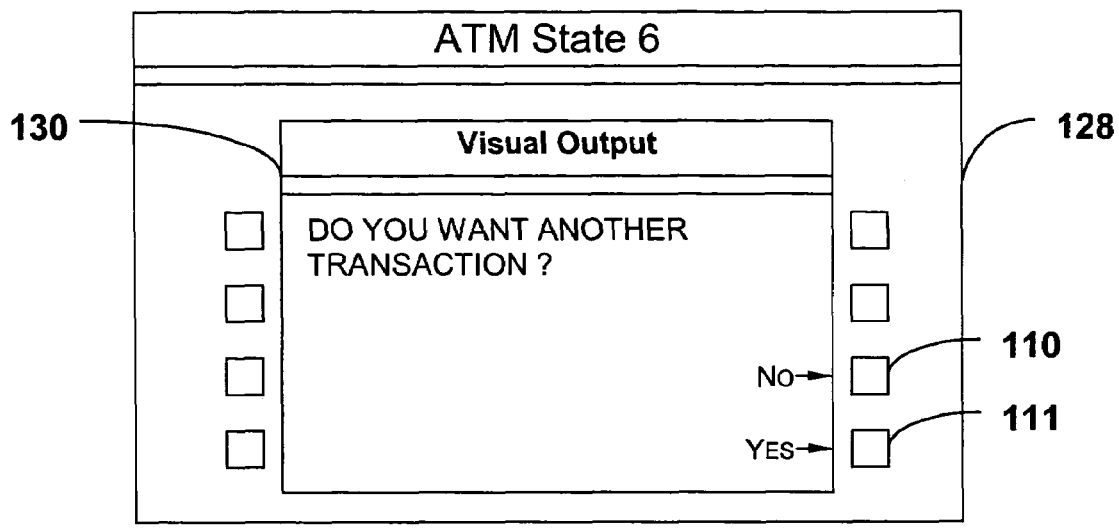

In an exemplary embodiment after the cash is dispensed, the ATM may change to a sixth state. FIG. 9 shows an example of sixth state 128. In this state, a visual output 130 inquires whether the customer wishes to select another transaction. If the customer wishes to proceed with another transaction, the function key indicated with reference numeral 111 may be pressed. On the other hand, if the customer does not wish to proceed with another transaction, the function key indicated with reference numeral 110 may be pressed. If the function key indicated with reference numeral 111 is pressed, the exemplary embodiment of the ATM may return to a previous state such as the described third state 112 shown in FIG. 5 for selecting another transaction. On the other hand, if the function key indicated with reference numeral 110 is pressed, the exemplary embodiment of the ATM may conclude the transaction and return to a previous state such as the described first state 102 shown in FIG. 3 which requests a new customer to swipe or insert their card for service.

In the example shown in FIGS. 7 and 8, the account's Disposable Cash amount is a positive value. However, it is within the scope of this invention that the Disposable Cash amount may be a negative value. This may occur when the dollar amount of the Expected Debits is greater than the account's Available Balance. The display of a negative disposable cash amount informs the customer that, based on the prescribed information, if funds are not transferred into the account at least equal to the negative value, there is a high probability that some of the expected debits will be refused by the bank due to insufficient funds. In such a situation, it is within the scope of further exemplary embodiments for the ATM to be operative to inquire whether the customer wishes to transfer funds into the account. If the customer selects to do so, the ATM may be operative to change to a state which inquires: from which account should the funds be transferred, and the amount of the transfer.

FIGS. 10-14 are schematic views of an alternative exemplary embodiment of an ATM. Specifically, FIGS. 10-14 show schematic views of another exemplary path a customer may take through the hierarchy of user interface menus or screens for purposes of having an ATM determine an account's Disposable Cash amount.

In this described exemplary embodiment, the ATM may proceed through the first and second states as shown in FIGS. 3 and 4. However, in the exemplary ATM illustrated in FIGS. 10-14, once the customer inputs the PIN (see FIG. 4), the ATM is operative to change to an alternative third state 150 illustrated in FIG. 10.

Figure 10:
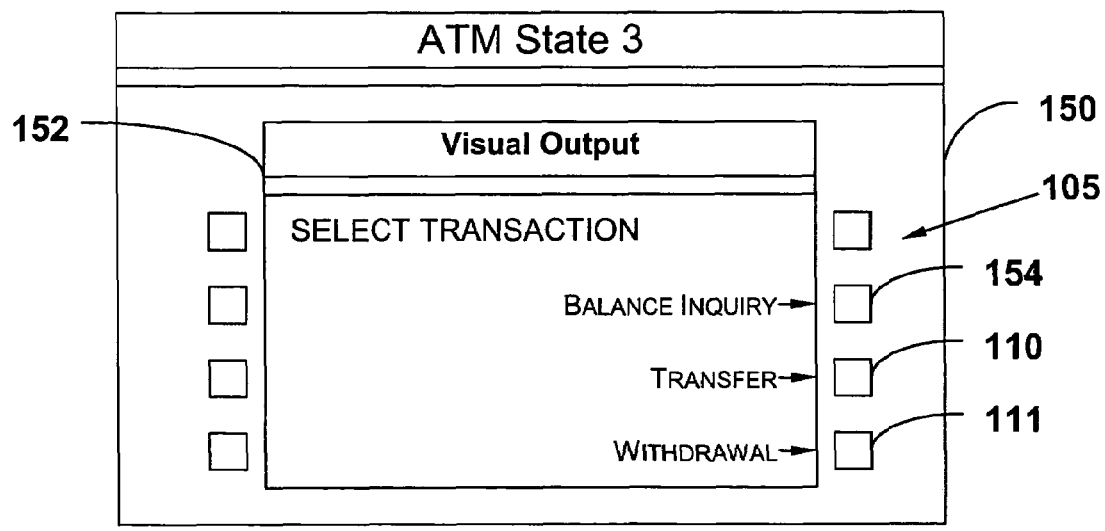

As shown in FIG. 10, when in this third state, a visible output 152 identifies a list of transaction functions from which the customer can choose, and visually points to the function keys 105 that are operative to select each transaction function. However, unlike the embodiment illustrated in FIG. 5, in this exemplary embodiment, indicia representative of a Disposable Cash transaction may not be displayed. Rather, the determination of the disposable cash amount may be associated with another type of transaction such as a withdrawal and/or balance inquiry transaction. As a result, the disposable cash amount may be shown in the particular ATM states that are associated with these transactions.

Figure 11:
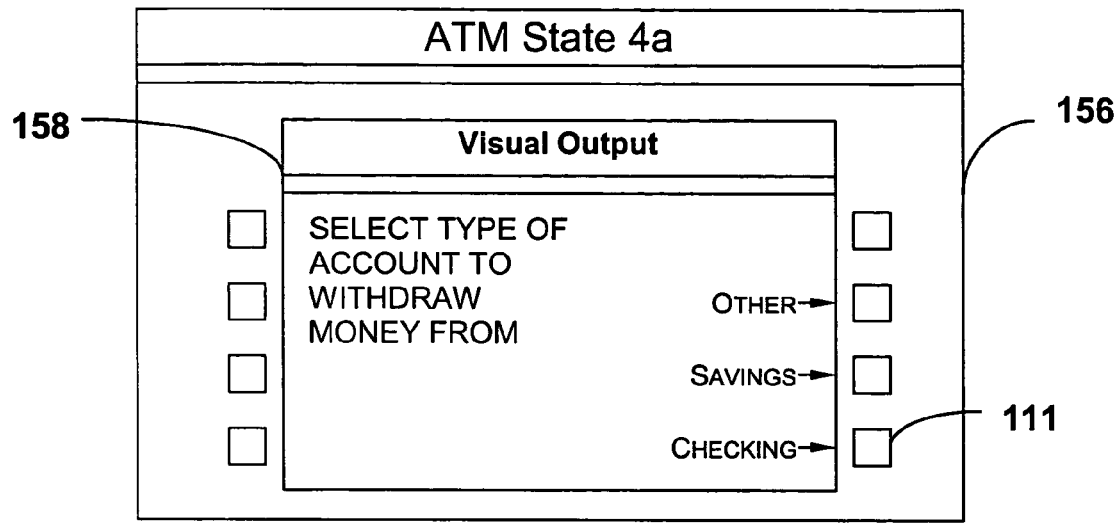
Figure 12:
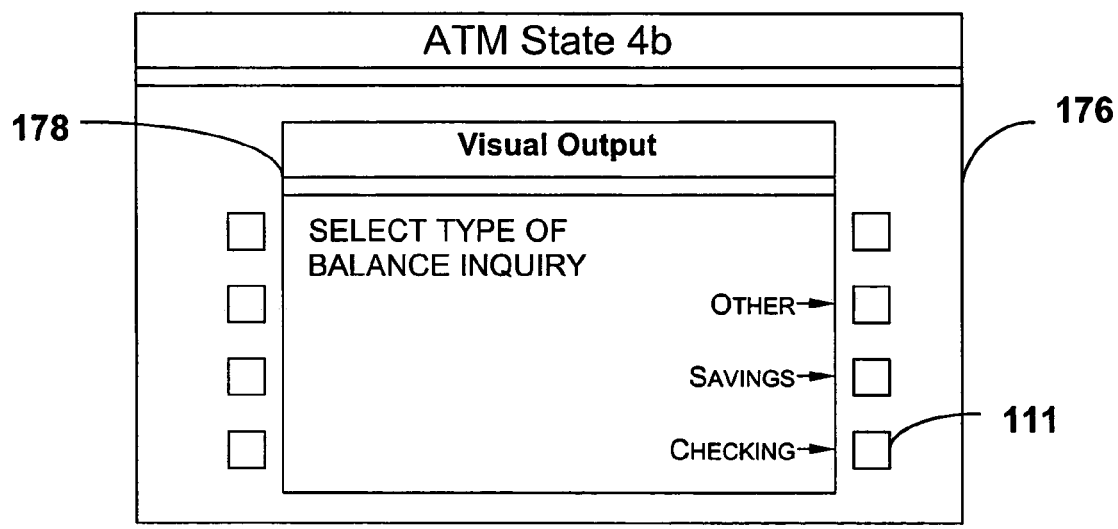
Figure 13:
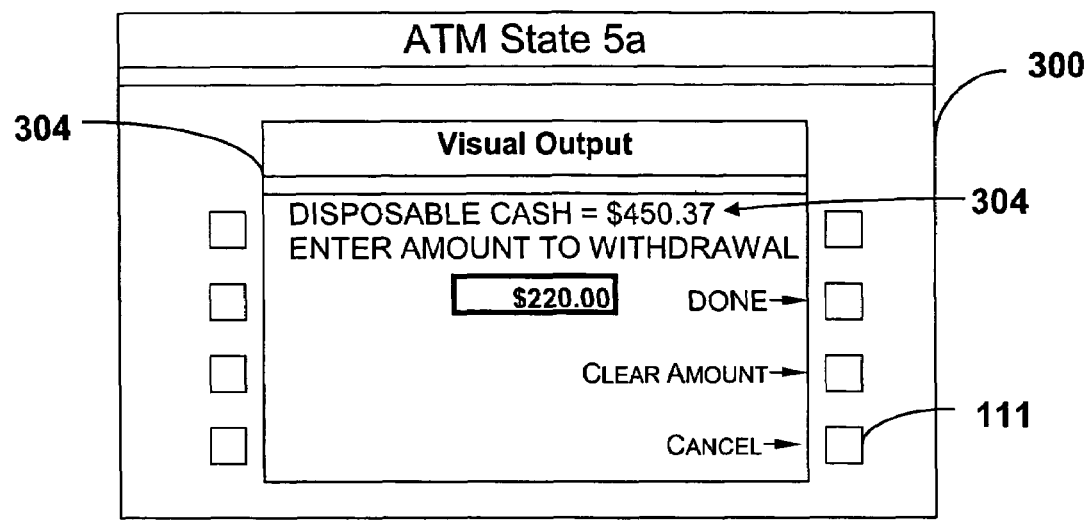

For example as illustrated in FIG. 10, if the customer wishes to use the ATM to withdraw funds from a bank account, the customer may press the function key indicated with reference numeral 111. In response the ATM changes to a fourth state 156 (FIG. 11). If the customer wishes to check on the balance of a particular account, the customer may press the function key indicated with reference numeral 154. In response the ATM may change to an alternative fourth state 176 (FIG. 12). These fourth states 156, 176 are illustrated in FIGS. 11 and 12, and include visual outputs 158, 178 which request the customer to indicate which account to use for the respective transactions of a withdrawal or balance inquiry.

Once an account is selected in either of the described fourth states 156, 176, the ATM may proceed to a fifth state which is specific to the type of transaction requested. For example, for a withdrawal transaction the ATM may change to a fifth state 300 shown in FIG. 13. Here the ATM may prompt the customer to enter a specific amount to withdraw. However, to aid the customer in determining how much to withdraw, the visual output 302 may include the Disposable Cash amount 304. In an alternative exemplary embodiment, the visual output 302 may not immediately display the Disposable Cash amount, but may indicate which function key to press to view the Disposable Cash amount.

Figure 14:
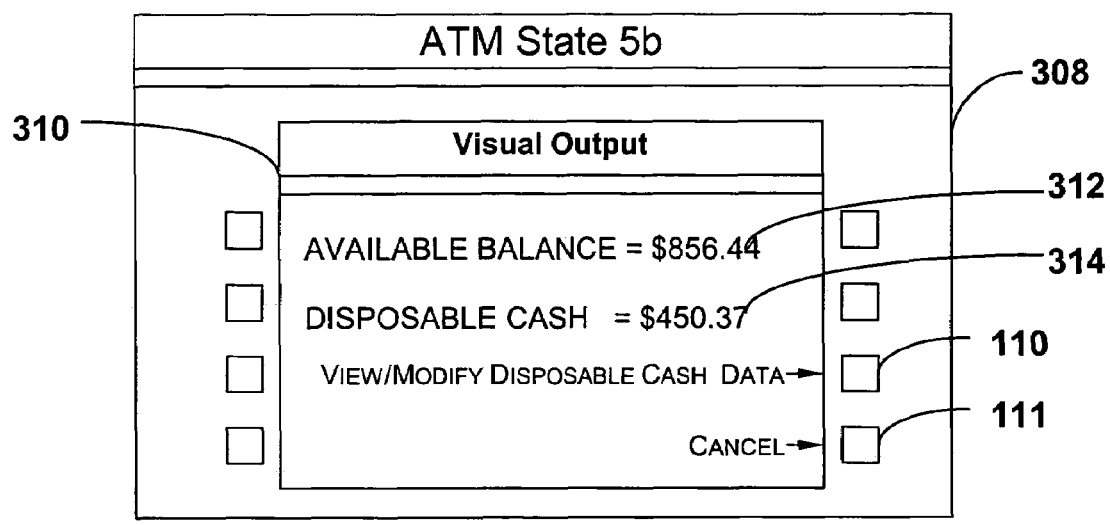

Referring back to FIGS. 10 and 12 if the user selects to view a Balance Inquiry (FIG. 10) and selects the account (FIG. 12), the ATM may change to a fifth state 308 shown in FIG. 14. Here the ATM may provide a visual output 310 which displays the Available Balance 312 and the Disposable Cash amount 314 for the account. As discussed previously, exemplary embodiments of the ATM may be operative to display the parameters used to calculate the Disposable Cash amount as well. For example, in the exemplary embodiment of the fifth state 308 shown in FIG. 14, the visible output 310 may indicate that the function key indicated with reference numeral 110 may be pressed to view and/or modify the parameters used to calculate the Disposable Cash amount. In response to this key being pressed, the ATM may change to a sixth state 206 illustrated in FIG. 15.

Figure 15:
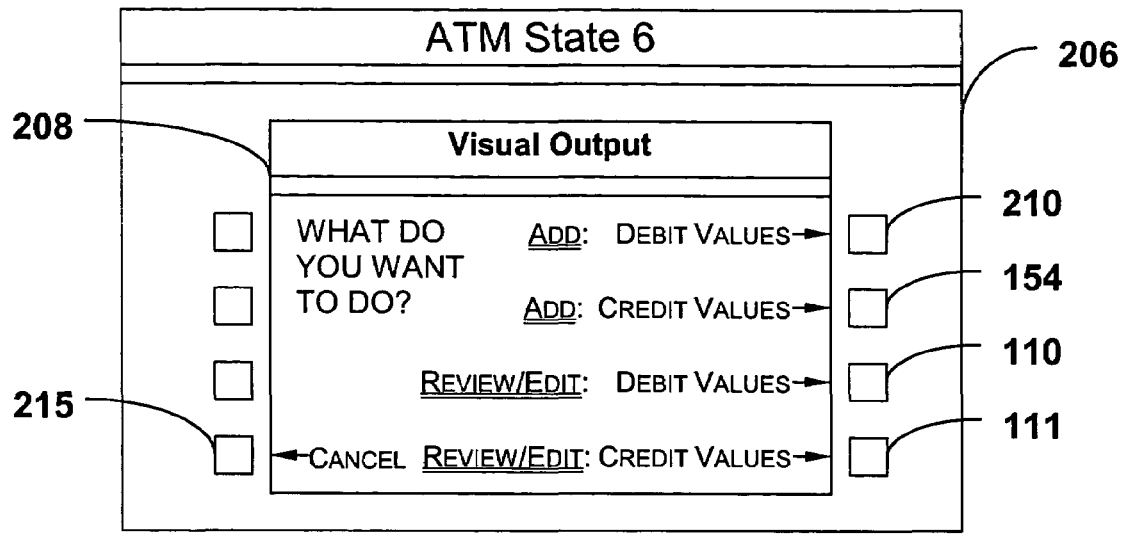

As shown in FIG. 15, when in this described sixth state 206, a visual output 208 indicates which function keys to press to add, view and edit expected debits and credits used to calculate the Disposable Cash amount. In this example, if the customer wishes to add a new expected debit or expected credit value, then the function keys indicated with reference numerals 210 or 154 respectively, may be pressed. Similarly, if the customer wishes to review/edit the date and amount of a prescribed expected debit or a prescribed expected credit, then the function keys indicated with reference numerals 110 or 111 respectively, may be pressed. Finally, if the customer no longer wishes to review or modify the parameters used in the disposable cash calculation, the function key indicated with reference numeral 215 may be pressed. If this function key is pressed, the ATM may change back to a previous state such as the described third state 150 shown in FIG. 10.

Figure 16:
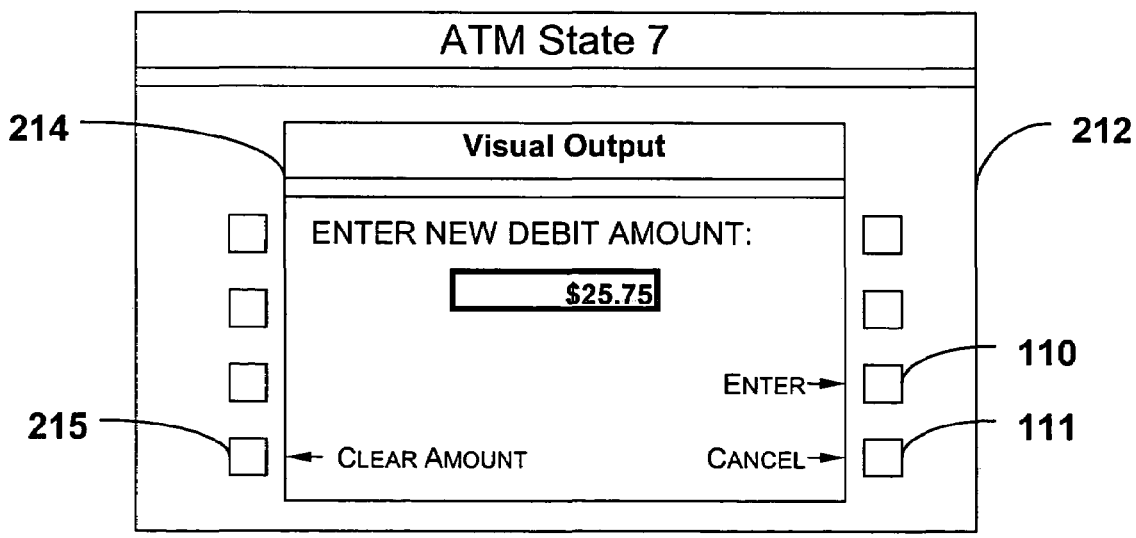

FIGS. 16-18 show examples of states and associated visual outputs that the ATM may present to a customer to add an expected debit value. In this described exemplary embodiment, when a customer wishes to add a new expected debit, the function key indicated with reference number 210 in the sixth state shown in FIG. 15 may be pressed. In response, the ATM may change to seventh state 212 illustrated in FIG. 16.

As shown in FIG. 16, when in state 212, a visual output 214 prompts the customer to enter the amount of the expected debit to be added. In this specific example, the amount to be added is "$25.75". This amount can be added by using the key pad associated with the ATM.

If the customer no longer wishes to add a new expected debit, the function key indicated by reference number 111 may be pressed. Upon doing so, the ATM changes back to the sixth state shown in FIG. 15. However, if the customer does wish to add a new expected debit, but the amount entered with the ATM's keypad was incorrect, the function key indicated with reference number 215 may be pressed. Upon doing so, the ATM clears the amount; thus, enabling the customer to enter the correct amount.

If the correct amount has been entered and the customer still wishes to proceed with adding this amount, the function key indicated with reference numeral 110 would be pressed. Upon doing so, the ATM would be operative to change to eighth state 216 illustrated in FIG. 17.

As shown in FIG. 17, when in state 216, a visual output 218 prompts the customer to enter the date the newly entered expected debit is expected to post to the selected account. In this specific example, the date is "Nov. 21, 2003". This date is added by using the key pad associated with the ATM. In alternative exemplary embodiments, the visual output 218 may prompt the user to enter a range of dates in which the debit may be expected to post to the account. In further exemplary embodiments, the customer may be enabled to leave the month and year fields blank or with zero values, to indicate that the debit is expected to post to the account each month on the specified day or range of days.

If the customer no longer wishes to add a new expected debit, the function key indicated with reference numeral 111 may be pressed. Upon doing so, the ATM may return to the sixth state shown in FIG. 15. However, if the customer does wish to add the new expected debit, but the date entered is incorrect, the function key indicated with reference numeral 215 may be pressed. Upon doing so, the ATM clears the date; thus, enabling the customer to enter the correct date.

If the correct date has been entered and the customer wishes to proceed with adding this new expected debit, the function key indicated with reference numeral 110 may be pressed. Upon doing so, the ATM changes to a ninth state 220 illustrated in FIG. 18.

As shown in FIG. 18, when in state 220, a visual output 222 inquires whether the date and amount of the new expected debit is correct. If the answer is "No", the function key indicated with reference numeral 110 may be pressed. When this key is pressed, the ATM returns to the seventh state shown in FIG. 16. There, the customer would be able to re-enter the new expected debit amount or cancel the process as set out above. If, however, the answer is "Yes", the function key indicated with reference numeral 111 may be pressed. When this key is pressed, the ATM transmits the requested change to the host banking system or other server for storing in a data store and, thereafter, reverts back to the sixth state shown in FIG. 15.

Figure 19:
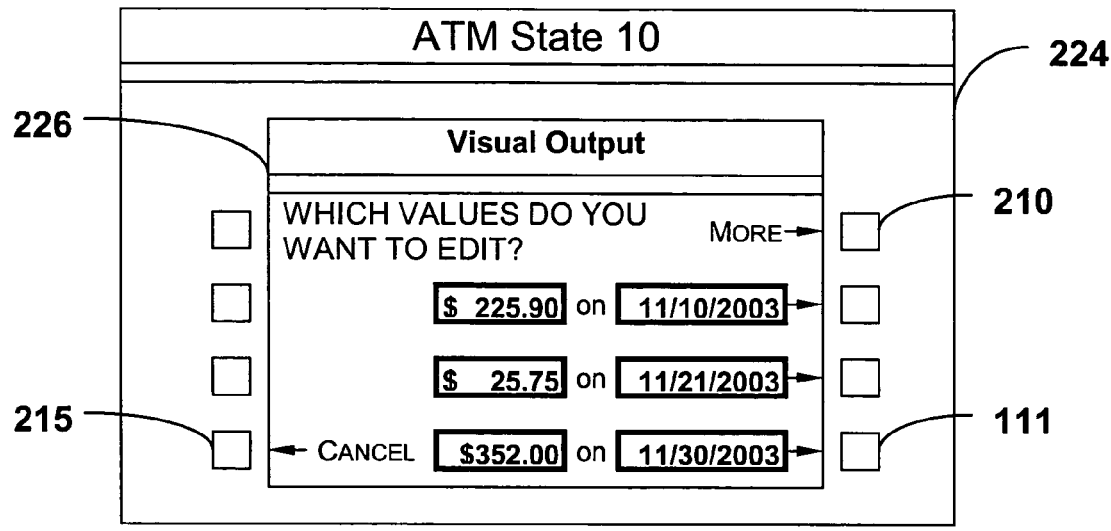

Now referring back to FIG. 15, in order to review/edit a prescribed expected debit, the function key indicated with reference numeral 110 may be pressed. When this function key is pressed, the ATM changes to a tenth state 224 illustrated in FIG. 19. As shown in FIG. 19, when in state 224, a visual output 226 inquires which prescribed expected debit does the customer wish to edit. The amounts shown are those which have been previously prescribed by the customer as set out above, including any amounts that may have been entered by the customer at an appropriately equipped ATM or though a web site provided by a customer's financial institution or other entity for example. Typically, the debits are listed in chronological order. However, in other exemplary embodiments the expected debits may be sorted by amount or description.

If there are more debits than those illustrated, the visual output 226 may include a function key 210 associated with the term "More". If the function key 210 is pressed, the ATM changes to another state (not shown) which lists the next set of expected debits. When the ATM state changes to show additional sets of expected debits, the ATM displays a function on visual output 226 which enables the customer to go back to a preceding set of debits. This function can be identified by the ATM displaying the term "Back" (not shown) for example.

If the customer no longer wishes to review/edit the listed expected debits, the function indicated with reference numeral 215 may be pressed. When this key is pressed, the ATM changes back to the sixth state shown in FIG. 15. However, if the customer does wish to edit an expected debit, the function key that corresponds with the debit which is to be edited would be pressed. For purposes of illustration, a presumption will be made that the customer wants to edit the expected debit associated with the function key indicated with reference numeral 111. Accordingly, when this key is pressed, the ATM changes to an eleventh state 228 illustrated in FIG. 20.

Figure 20:
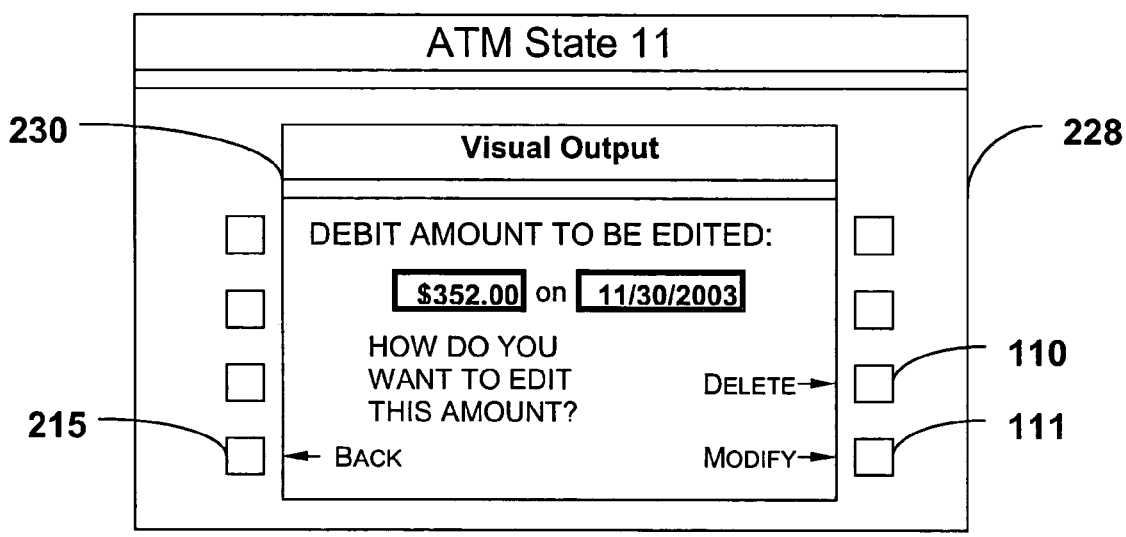

As shown in FIG. 20, when in state 228, a visual output 230 shows the date and amount of the expected debit which is to be edited. The visual output 230 may also inquire how the expected debit is to be edited. If the customer no longer wishes to edit that particular prescribed debit, the function indicated with reference numeral 215 may be pressed. When this key is pressed, the ATM reverts back to the tenth state shown in FIG. 19. However, if the customer wishes to delete the expected debit, the function indicated with reference numeral 110 may be pressed. When this key is pressed, the ATM transmits a message to the host banking system or other server to delete this value from the data store so that it will not be considered in the calculation of the account's disposable cash amount. The ATM may then return back to tenth state shown in FIG. 19.

Finally, if the customer wishes to modify the expected debit, the function indicated with reference numeral 111 in the eleventh state shown in FIG. 20 may be pressed. When this key is pressed, the ATM may change to a state which corresponds to the previously described seventh, eighth and ninth states shown in FIGS. 16-18. In the exemplary embodiment, when the ATM proceeds through the seventh, eighth and ninth states to modify expected debits, the visual outputs may include the original values for the debit amount and debit date. The customer may then clear and re-enter different amounts or dates as desired.

Referring back to FIG. 15, a customer may choose to enter one or more expected credit values by pressing the corresponding function keys indicated by the visual output 208 in the sixth state. The date or dates associated with the expected credits may be used to determine the next Credit Date. As discussed previously, The Total Forthcoming Debits are determined responsive to the Current Date and the next Credit Date. In an alternative exemplary embodiment, rather than providing functions for entering and modifying expected credits, the ATM may provide a visual output with a function selectable by the customer to enter a specific day of the month to correspond to the next Credit Date. In this described exemplary embodiment, the customer may only need to enter expected debits and a single Credit Date for use with calculating the Disposable Cash amount as discussed previously with respect to Equations 1-3.

It is to be understood that the described ATM states and visible outputs set out above are merely examples of performing transactions involving the determination of a disposable cash amount. Other transaction functions for the described ATM and alternative exemplary embodiments of the ATM may have additional and/or other types of ATM states, visible outputs, and/or audible outputs which enable a customer to view a disposable cash amount for an account and/or perform transactions using the disposable cash amount.

Computer software instructions used in operating the automated banking machines and connected computers may be loaded from computer readable media or articles of various types into the respective computers. Such computer software may be included on and loaded from one or more articles such as diskettes, compact disks, CDs, DVDs, tapes, flash memory device, hard drives and/or other internal or portable storage devices placed in operative connection with the automated banking machine. Other articles which include data representative of the instructions for operating computers in the manner described herein are suitable for use in achieving operation of automated banking machines and systems in accordance with exemplary embodiments.

The exemplary embodiments of the automated banking machines and systems described herein have been described with reference to particular software components and features. Other embodiments of the invention may include other or different software components which provide similar functionality.

Thus the new automated banking machine system and method achieves one or more of the above stated objectives, eliminates difficulties encountered in the use of prior devices and systems, solves problems and attains the desirable results described herein.

In the foregoing description certain terms have been used for brevity, clarity and understanding, however no unnecessary limitations are to be implied therefrom because such terms are used for descriptive purposes and are intended to be broadly construed. Moreover, the descriptions and illustrations herein are by way of examples and the invention is not limited to the exact details shown and described.

In the following claims any feature described as a means for performing a function shall be construed as encompassing any means known to those skilled in the art to be capable of performing the recited function, and shall not be limited to the features and structures shown herein or mere equivalents thereof. The description of the exemplary embodiment included in the Abstract included herewith shall not be deemed to limit the invention to features described therein.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

I claim:

1. A method comprising:
   a) receiving through operation of at least one input device of an ATM, information representative of a financial account, wherein the ATM includes a cash dispenser, wherein the ATM is operative to determine an available balance amount associated with the account through operation of at least one computer of the ATM;
   b) determining through operation of the at least one computer in operative connection with the ATM, a disposable cash amount associated with the account, wherein the disposable cash amount is less than the available balance amount, wherein the disposable cash amount is determined based at least on the available balance amount, at least one expected future debit amount associated with the account, and at least one expected future credit amount associated with the account; and
   c) displaying through operation of the at least one computer of the ATM, the disposable cash amount through at least one output device of the ATM.

2. The method according to claim 1, wherein in (a) the input device includes a card reader and the information representative of a financial account is read from a card, further comprising:
   d) determining through operation of the at least one computer of the ATM, the available balance amount associated with the account; and
   e) displaying through operation of the at least one computer of the ATM, the available balance amount through the at least one output device of the ATM.

3. The method according to claim 1, further comprising:
   d) selecting the at least one expected future debit amount associated with the account through operation of at least one computer remote from the ATM; and
   e) calculating the disposable cash amount through operation of at least one computer, responsive to the at least one expected future debit amount.

4. The method according to claim 3, wherein in (e) the at least one computer remote from the ATM calculates the disposable cash amount.

5. The method according to claim 3, wherein in (d) the at least one expected future debit amount is stored in at least one data store in operative connection with the at least one computer remote from the ATM, wherein the at least one expected future debit amount stored in the data store includes a debit amount and at least one expected debit date.

6. The method according to claim 5, wherein the calculation of the disposable cash amount in step (e) includes subtracting the debit amount from the available balance amount associated with the account.

7. The method according to claim 6, further comprising:
f) determining at least one credit date through operation of at least one computer;
wherein in (d) the at least one expected future debit amount is selected responsive to the at least one debit date being at least one of less than or equal to the credit date.

8. The method according to claim 7, wherein in (f) the at least one credit date corresponds to at least one date associated with the at least one expected credit, wherein the at least one expected credit is stored in the at least one data store, and the at least one credit date is stored in the at least one data store.

9. The method according to claim 7, further comprising:
g) determining at least one current date through operation of at least one computer, wherein the credit date is greater in time than the current date;
wherein in (d) the at least one expected future debit amount is selected responsive to the at least one debit date debit being at least one of greater than or equal to the current date.

10. The method according to claim 9, further comprising:
h) determining through operation of at least one computer that at least one further expected debit stored in the at least one data store in association with the account has not been posted to the account and includes a debit date that is at least one of less than or equal to the current date;
wherein the calculation of the disposable cash amount in step (e) includes subtracting a debit amount associated with the at least one further expected debit from the available balance associated with the account.

11. The method according to claim 10, further comprising:
i) determining through operation of at least one computer that at least one credit transaction has posted to the account within a predetermined amount of time before the current date;
wherein the calculation of the disposable cash amount in step (e) includes subtracting an amount associated with the at least one posted credit transaction from the available balance associated with the account.

12. The method according to claim 3, wherein in (e) the at least one computer of the ATM calculates the disposable cash amount.

13. The method according to claim 3, wherein further comprising:
f) displaying through operation of the at least one computer of the ATM, the at least one expected future debit amount through the at least one output device of the ATM.

14. The method according to claim 13, further comprising:
g) receiving an input representative of the at least one expected future debit amount through operation of the least one input device of the ATM;
h) communicating the inputted at least one expected future debit amount to the at least one computer remote from the ATM; and
i) storing the at least one expected future debit amount in association with the account in at least one data store in operative connection with the at least one computer remote from the ATM.

15. The method according to claim 14, wherein the input device includes an invoice reader, wherein in (g) the operation of the input device includes scanning a printed bill with the invoice reader.

16. The method according to claim 3, further comprising:
f) selecting the at least one expected credit associated with the account through operation of at least one computer remote from the ATM.

17. The method according to claim 16, wherein the at least one expected credit corresponds to an amount of interest estimated to be credited to the account.

18. The method according to claim 3, further comprising:
f) receiving expected debit data representative of the at least one expected future debit amount through operation of at least one web server, wherein the web server is operative to provide at least one web page usable to acquire the expected debit data from computers connected to the web server through a global communication network; and
g) storing the at least one expected debit data in association with the account in at least one data store in operative connection with the at least one computer remote from the ATM.

19. The method according to claim 1, further comprising:
d) determining a dispense amount that is equal to or less than the disposable cash amount;
e) causing the cash dispenser to dispense cash in an amount that corresponds to the dispense amount.

20. The method according to claim 19 wherein in (d) the dispense amount is determined to correspond to the largest amount of currency that the ATM is operative to dispense which is less than or equal to the disposable cash amount.

21. A method comprising:
(a) receiving through operation of at least one user input device of an ATM, information representative of a financial account, wherein the ATM includes at least one computer, at least one display device, and a cash dispenser;
(b) determining an available balance amount associated with the account through operation of at least one computer;
(c) responsive to both at least one expected future debit amount and at least one expected future credit amount associated with the account, determining through operation of at least one computer a disposable cash withdrawal amount associated with the account, wherein the disposable cash withdrawal amount is less than the available balance amount; and
(d) displaying through the at least one display device, the disposable cash withdrawal amount determined in step (c).

22. The method according to claim 21 and further comprising:
(e) determining through operation of at least one computer a cash withdrawal amount up to the disposable cash amount to allow the account to have sufficient funds to cover expected future debits up to a predetermined future date.

23. The method according to claim 21 wherein the at least one user input device enables a machine user to request a disposable cash transaction which includes a cash dispense associated with the disposable cash withdrawal amount, and further comprising:
(e) receiving a disposable cash transaction request through the at least one user input device.

24. The method according to claim 23 wherein the at least one user input device includes a disposable cash transaction function key, wherein a machine user is able to request a disposable cash transaction by pressing the key, and wherein step (e) includes receiving a disposable cash transaction request through the key.

25. At least one article of computer readable media bearing computer executable instructions, which instructions are operative to cause at least one computer in an automated banking machine to carry out a method comprising:

(a) operating the automated banking machine to receive through operation of at least one user input device of the automated banking machine, information representative of a financial account, wherein the automated banking machine includes at least one display device and a cash dispenser;

(b) operating the automated banking machine to cause to be determined an available balance amount associated with the account;

(c) operating the automated banking machine to cause to be determined responsive to both at least one expected future debit amount and at least one expected future credit amount associated with the account, a disposable cash withdrawal amount associated with the account, wherein the disposable cash withdrawal amount is less than the available balance amount; and (d) operating the automated banking machine to display through the at least one display device, the disposable cash withdrawal amount determined in step (c).

* * * * *